UNITED STATES PATENT OFFICE.

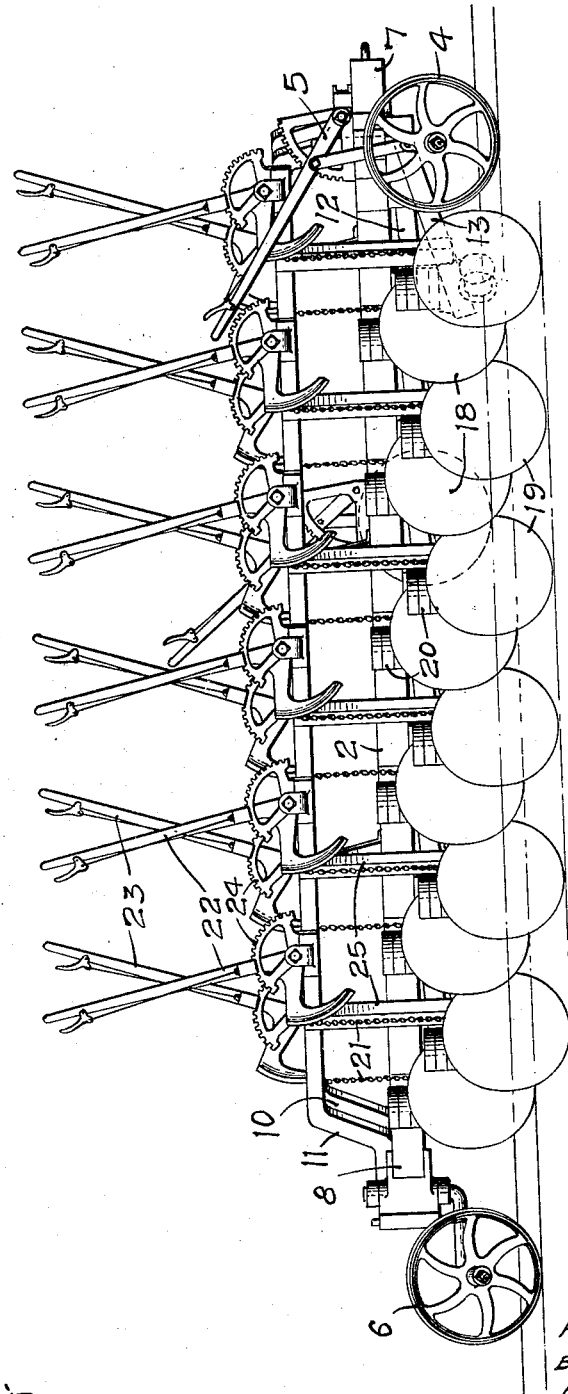

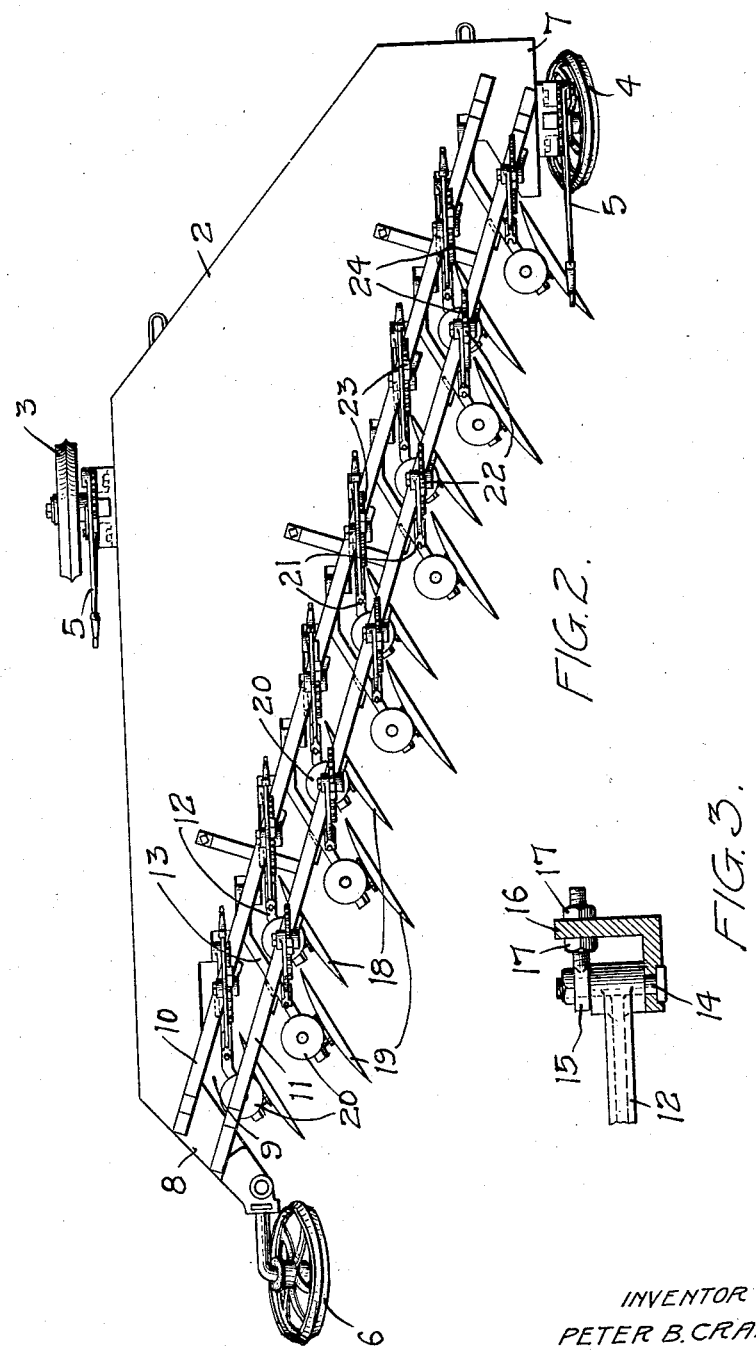

PETER B. CRANE, OF LONG LAKE, MINNESOTA, ASSIGNOR TO C. D. FOLLANSBEE, OF LONG LAKE, MINNESOTA.

DEEP-TILLING GANG-PLOW.

1,162,457.  Specification of Letters Patent.  Patented Nov. 30, 1915.

Application filed May 23, 1912. Serial No. 699,208.

*To all whom it may concern:*

Be it known that I, PETER B. CRANE, of Long Lake, Hennepin county, Minnesota, have invented certain new and useful Improvements in Deep-Tilling Gang-Plows, of which the following is a specification.

The object of my invention is to provide a deep tilling plow by means of which the soil can be thoroughly stirred and cut up to a considerable depth, the plows being arranged so that one plow will travel in the furrow cut by the preceding plow.

A further object is to provide a gang plow in which both sets of plows will be movable vertically, independently of one another and be capable of riding over an obstruction in the ground without affecting the other plows.

Other objects of the invention will appear from the following detailed description.

The invention consists generally in various constructions and combinations, all as hereinafter described and particularly pointed out in the claims.

In the accompanying drawings forming part of this specification, Figure 1 is a rear view of a deep tilling gang plow, embodying my invention, Fig. 2 is a plan view of the same, Fig. 3 is a detail sectional view showing the manner of mounting the plow beams on the frame of the machine.

In the drawing, 2 represents the frame of the machine having forward carrying wheels 3 and 4 provided with lever mechanisms 5 for raising and lowering them and a rear caster wheel 6. The frame is provided with extensions 7 and 8 at the ends thereof on which the wheels 4 and the caster wheel 6 are mounted. Between these extensions a recess 9 is formed. 10 and 11 represent bars secured at their ends to the extensions 7 and 8 and extending in parallel relation with one another over the recess 9.

12 and 13 represent forward and rear beams, pivotally supported on bolts 14 which are mounted at one end in the machine frame and supported at their other ends in I-bolts 15 having threaded ends projecting through flanges 16 and provided with adjusting nuts 17. By means of these I-bolts and adjusting nuts the bolts 14 may be tilted slightly to shift the beams laterally and change the position of the disks 18 and 19 mounted thereon.

As shown by the drawings, I prefer to arrange the disks in groups, the forward group being composed of the disk 18 mounted on the beams 12 and the rear group being composed of the disks 19 mounted on the beams 13. The beams and disks are so arranged that a disk 19 will follow in the furrow cut by a disk 18 except at the front and rear ends of the machine, where a single disk of one group is provided. At the forward end of the machine I prefer to provide one beam 13 and a disk 19, forming the forward disk of the rear group, and at the rear end of the machine I provide a single beam 12 and a disk 18 thereon, forming the rear disk of the forward group. The forward disk 19 on the second time around the land will travel in the furrow that was cut by the rear disk 18 on the first trip around the land, and the other disks 19 of the rear group will follow in the furrows cut by the disks of the forward group and increase the depth of cut thereof. Upon the beams 12 and 13 I prefer to arrange suitable weights 20, which are adapted to force the disks into the soil to the required cutting depth. These weights may be increased or decreased in number according to the desired pressure of the disks.

For the purpose of limiting the depth of cut of the disks I provide flexible means, such as chains 21, connecting the beams with independent levers 22 and 23 pivoted respectively on the bars 10 and 11, one set of levers operating to raise or lower one set of beams and the other set of levers for raising or lowering the other set of beams. Suitable quadrants 24 are provided in connection with the levers with which locking latches on the levers engage. By means of this machine a series of furrows may be cut and as each disk operates independently of all of the other disks it may rise and fall as the machine moves along, riding over an obstruction and accommodating itself to the character of the soil without being affected by the position of the other disks and the adjustment of the levers will determine the depth of cut of any one of the disks independently of all the other disks. The bars 25 depend vertically from the bar 11 in position to contact with the rear portions of the beams and hold them against lateral movement under the pressure of the disks in the ground.

Any suitable number of disks may be mounted in the frame of the machine and as the operating levers are located directly above the beams the person in charge of the machine has quick and accurate control of each beam and disk.

The plow disks in this application may be operated in substantially the same manner as shown and described in my pending application on tilling machines, filed February 15, 1912, Serial No. 677,736, in which a single pair of disks is shown, one pivotally supported and operating independently of the other. The machine of this application involves a number of these disks, arranged in staggered relation to one another, and beginning at the forward end of the machine, the single disk shown may be utilized to cut a deep furrow while the adjacent disk of the forward row may cut a shallow furrow that is increased in depth by the disk immediately following of the rear row, and this operation may be carried on entirely across the machine, the rear disk of the forward row cutting a shallow furrow in which the forward disk of the rear row may run on the second time around the land, as hereinbefore stated.

I claim as my invention:—

1. A deep soil gang tilling machine comprising a frame having carrying wheels, a series of beams pivotally connected with said frame, said beams being arranged in rows obliquely with respect to the line of travel, a series of disks mounted in groups on said beams, the disks of one group being in advance of those of the other group and offset with respect thereto, the rear disks traveling in the furrows made by the forward disks.

2. A machine of the class described comprising a frame having carrying wheels, a series of beams pivotally connected therewith, said beams being arranged in groups, disks mounted on said beams respectively, the disks of one group of beams being in advance of and offset with respect to the disks of the other group of beams, independent levers mounted on said frame and connected respectively with said beams for independent vertical movement of said beams, the rear disks traveling in the furrows cut by the forward disks.

3. A machine of the class described comprising a frame having carrying wheels, beams arranged in groups and pivotally connected with said frame, the beams of one group being movable vertically, independently of one another and of the beams of the other group, disks mounted on said beams respectively, the disks of one group of beams being in advance and off set with respect to the disks of the other group of beams and obliquely arranged with respect to the direction of movement of the machine, bars arranged side by side and bridging said beams, independent levers mounted on said bars and having independent connections with said beams for raising or lowering them and for limiting the downward movement of said beams and disks.

4. A machine of the class described comprising a frame having carrying wheels, beams pivotally connected with said frame, the pivots of said beams being horizontal and allowing a slight horizontal adjustment of said beams, disks journaled on said beams, levers having flexible connections with said beams for raising or lowering them independently of one another and bars depending vertically from said frame at one side of said beams and operating as stops for said beams to limit the lateral movement thereof.

5. A machine of the class described comprising a frame having carrying wheels, beams pivotally connected to said frame, said beams being arranged in groups, disks mounted on said beams, the disks of one group of beams being in advance of and offset with respect to the disks of the other group of beams, means for raising or lowering said beams and disks independently of one another, removable weights mounted on said beams for forcing said disks into the soil, the rear disks traveling in the furrow previously cut by the forward disks.

6. A deep soil gang tilling machine comprising a frame having carrying wheels, a series of beams arranged in groups and pivotally connected at their forward ends to said frame, said groups of beams being disposed in parallel rows obliquely arranged with respect to the line of travel of the machine with the beam pivots of one group in advance of those of the other group, a series of disks mounted on said beams, the disks of one group of beams being in advance of the disks of the other group of beams, and means for raising or lowering the beams and disks of each group independently of one another and of the beams of the other group.

7. A gang tilling machine comprising a frame having carrying wheels, forward and rear groups of plows, the forward plow of the rear group traveling on the second time around the land in the furrow made by the rear plow of the forward group on the first time around the land, and the plows of one group being freely movable vertically, independently of the plows of the other group.

8. A gang tilling machine comprising a frame having carrying wheels, disk plows mounted in forward and rear groups therein and said groups being arranged obliquely with respect to the line of travel of the machine, the plows of the rear group traveling in the furrows made by the plows of the forward group and movable independently of the plows of the forward group to increase the depth of cut thereof.

9. A deep soil gang tilling machine comprising a frame having carrying-wheels, a series of beams pivotally connected with said frame in rows obliquely arranged with respect to the line of travel of the machine, disks mounted on said beams, there being a forward and a rear group of disks, the rear disks traveling in the furrows cut by the forward disks, means for forcing said disks into the soil to increase the depth of cut thereof, and means for limiting the depth of cut of said disks.

10. A deep soil gang tilling machine comprising a frame having carrying wheels, a series of beams pivotally connected therewith, said beams being arranged in groups, disks mounted on said beams respectively, the disks of one group of beams being in advance of and offset with respect to the disks of the other group of beams, the rear disks traveling in the furrows cut by the forward disks, and means for raising and lowering the disks and beams of each group independently of one another.

11. A deep soil gang tilling machine comprising a frame having forward and rear carrying wheels, forward and rear groups of disk plows mounted in said frame, the forward disk of the rear group traveling in the rear of the forward carrying wheel and in line substantially therewith, the rear disk of the forward group traveling in advance of the rear carrying wheel and in line substantially therewith, and the remaining disks of the rear group traveling in the furrows made by the corresponding disks of the forward group, and independent means for regulating the depth of cut of said disks.

12. A deep soil gang tilling machine comprising a frame having carrying wheels, disks mounted in rows thereon, the disks of one row being in advance and offset with respect to the disks of the other row, and means for raising and lowering the disks of each row independently of one another.

In witness whereof, I have hereunto set my hand this 16th day of May 1912.

PETER B. CRANE.

Witnesses:
GENEVIEVE E. SORENSEN,
EDWARD A. PAUL.

Copies of this patent may be obtained for five cents each, by addressing the "Commissioner of Patents, Washington, D. C."